United States Patent [19]
Katsura

[11] 3,751,975
[45] Aug. 14, 1973

[54] TORSION DIGITAL VISCOMETER

[75] Inventor: Takeshi Katsura, Tokyo, Japan

[73] Assignee: Ono Sokki Co., Ltd., Tokyo, Japan

[22] Filed: Aug. 12, 1971

[21] Appl. No.: 171,139

[30] Foreign Application Priority Data
Sept. 1, 1970   Japan................................. 45/76902

[52] U.S. Cl. .................................................. 73/59
[51] Int. Cl. ......................................... G01n 11/10
[58] Field of Search ................................. 73/59, 60

[56] References Cited
UNITED STATES PATENTS
| | | | |
|---|---|---|---|
| 3,572,086 | 3/1971 | Johnson | 73/59 |
| 1,281,042 | 10/1918 | MacMichael | 73/59 |
| 2,643,543 | 6/1953 | Herzog | 73/59 |
| 2,660,885 | 12/1953 | Evans | 73/59 |

FOREIGN PATENTS OR APPLICATIONS
| | | | |
|---|---|---|---|
| 1,911,502 | 10/1969 | Germany | 73/59 |
| 845,866 | 6/1952 | Germany | 73/59 |
| 1,184,119 | 12/1964 | Germany | 73/59 |

Primary Examiner—Richard C. Queisser
Assistant Examiner—Joseph W. Roskos
Attorney—Harold T. Stowell et al.

[57]   ABSTRACT

A rotary type viscometer having a torsion bar mounted in driving relationship with the rotor and a digital detector is mounted to the rotor. The torsion bar includes spaced coaxially supported magnetic cylinders each having a toothed external surface cooperatively arranged in spaced relationship with a pair of toothed magnetic ring members of a pair of magnetic pickups. The torsion bar and magnetic ring members are each supported for at least limited rotation. The change in phase difference of a reference phase difference is detected in the outputs of the magnetic pickup in response to the turning torque on the torsion bar.

6 Claims, 10 Drawing Figures

TORSION DIGITAL VISCOMETER

BACKGROUND OF THE INVENTION

The present invention relates to a viscometer designed to measure the viscosity of a viscous material.

Conventional rotary type viscometers are widely used to measure the viscosity of a material such as gelatine, printing ink, paint, blood and etc. In such devices, viscosity measurements are achieved by measuring turning torque, i.e., when turning a cylinder or rotor at a constant velocity in a viscous material being measured, a turning torque is produced that opposes said cylinder or rotor from turning. The turning torque is almost proportional to the viscosity of the viscous material.

Specifically, rotary type viscometers have a detector to detect the turning torque and the detector is directly and mechanically coupled with the rotary shaft of said cylinder or rotor. For example, in one known form of a rotary type viscometer, a spring is attached to a rotary shaft, and the resistance of a viscous material being measured is indicated on the scale plate by the distortion produced on said spring.

Although such devices have been generally satisfactory, there still exists a need for improved apparatus of this type wherein an error caused by the mechanical friction between the torque detector and the rotary portion connected therewith is eliminated. Additionally, there exists a need for improved apparatus having greater accuracy. It has been very hard to achieve greater accuracy with known devices wherein the detection and indication or torque corresponding to the viscosity of the material being measured have been accomplished analogically.

SUMMARY OF THE INVENTION

Therefore, it is the principal object of the present invention to provide a viscometer wherein viscosity measurements are made with increased accuracy while errors caused by mechanical friction from the coupling with the detector portion are eliminated. To this end, in accordance with one feature of the invention, the torque corresponding to the viscosity of a material being measured is detected by a rotary member without making contact mechanically to the torsion bar.

Another specific object of the invention is to provide an improved viscometer by which viscosity measurements can be achieved with greater accuracy and stability. To this end, the detection and indication of torque corresponding to viscosity and with which signals detected can be easily utilized for various control signals is performed digitally.

A better understanding of the invention may be had from the following detailed description when read in connection with the accompanying drawings wherein like parts throughout the several views are identified with like reference characters.

BRIEF DESCRIPTION OF THE DRAWINGS

FIG. 3 (b) illustrates the signals appearing at the output of gate 30 of FIG. 2; FIG. 3 (c) illustrates the time duration of the signal applied to gate 31 of FIG. 2 and FIG. 3 (d) illustrates the form of pulse groups applied to counter 36.

Referring to FIG. 1 of the drawings, illustrated is a sectional view of one example of the construction of the viscometer of the invention, wherein 1 is a fixed tank, 2 is a rotor or propeller, 3 is a rotary shaft thereof, 4 is a support base of a torque detecting portion described hereinafter, 5 is a screw for adjusting the height of said support base 4, 6 is a torsion bar, and 7 and 8 are cylinders which consist of a magnetic material, installed adjacent to both ends of said torsion bar 6. Gear teeth jag are provided at a constant pitch on the exterior circumference of each of said cylinders 7 and 8. The gear teeth may be applied to the entire portion of the exterior circumference of each of said cylinders 7 and 8 or only to the edge area of each of said cylinders as shown in FIG. 1. 9 is a magnetic pickup installed on the same axis as said cylinder 7, which comprises a ring 10 made of a magnetic material having gear teeth at a constant pitch on the interior circumference, a yoke 11, a cylindrical permanent magnet 12 and a detecting coil 13. 14 is another magnetic pickup placed opposite to said cylinder 8 but on the same axis as said cylinder 8. Like magnetic pickup 9, magnetic pickup 14 comprises a ring 15 having gear teeth on the interior circumference, a yoke 16, a cylindrical permanent magnet 17 and a detecting coil 18. 19 and 20 are bearings for torsion bar 6, 21 is a holder for both magnetic pickups 9 and 14, 22 and 23 are output terminals of detection coils 13 and 18, 24 is a motor such as a synchronous motor whereby both torsion bar 6 and rotor 2 are turned. 25 is a flange thereby torsion bar 6 is connected to the rotary shaft of motor 24, 26 is another flange to connect torsion bar 6 to the rotary shaft 3 of said rotor 2 and 27 is a housing.

Figure 1:
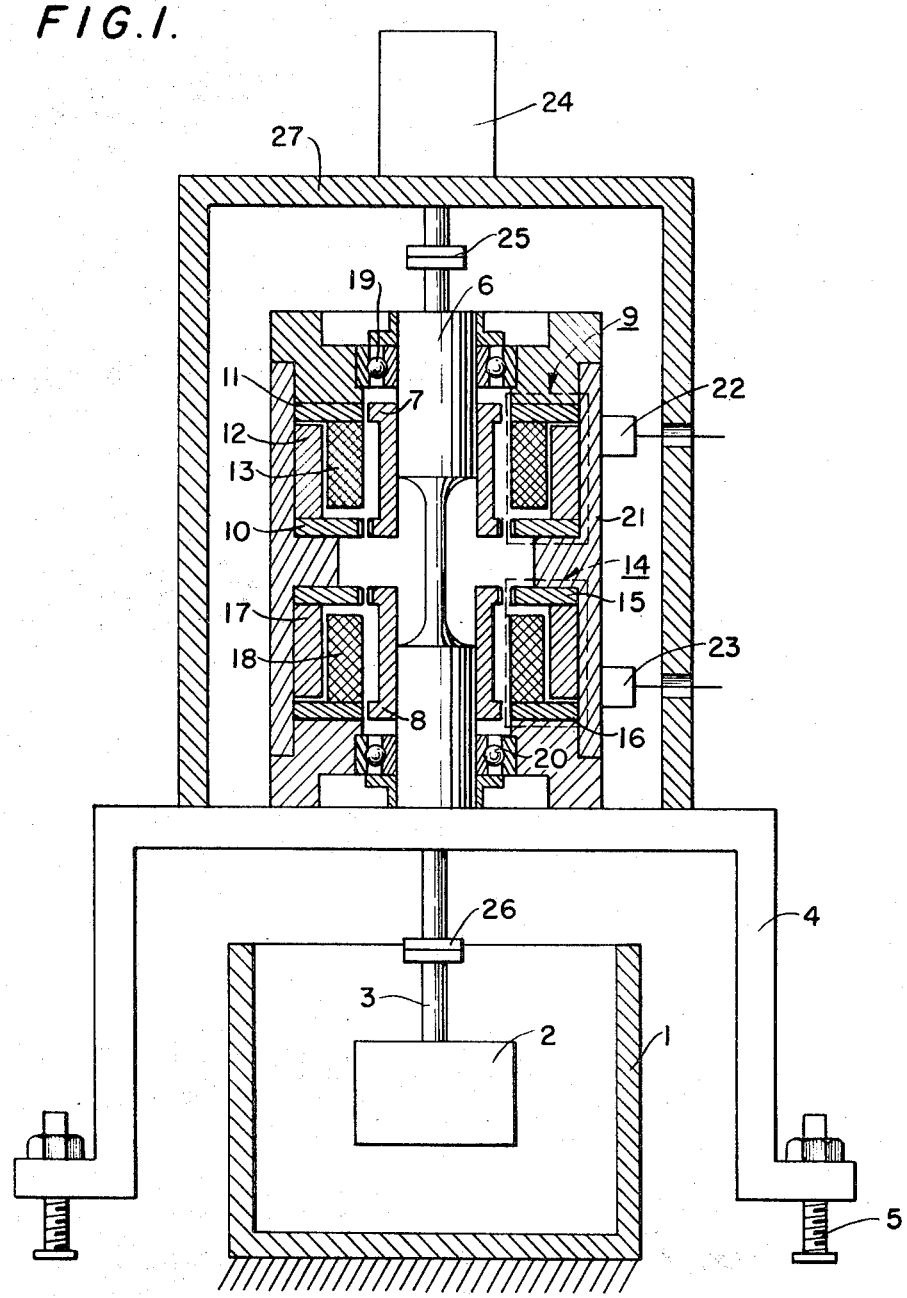
FIG. 1 is a sectional view of a viscometer embodying one form of the present invention.

When both torsion bar 6 and rotor 2 run idle at a constant angular velocity by the operation of motor 24 with fixed tank 1 empty, the toothed cylinders 7 and 8 installed on torsion bar 6 are caused to turn in accordance with the rotation of the torsion bar 6. If the tooth pitch on the exterior circumference of each of said cylinders 7 and 8 is equal to each other and likewise the tooth pitch on the interior circumference of each of the rings 10 and 15 is equal, through rotation of the cylinders 7 and 8, AC voltages of almost sine or square wave having equal frequencies and constant phase differences appear on output terminals 22 and 23 of detecting coils 13 and 18.

When turning rotor 2 with a viscous material in the fixed tank 1, a torsion corresponding to the viscosity of the material is produced on torsion bar 6, causing the correlation between cylinders 7 and 8 to change. By the change of this correlation, the phase difference of the AC voltages appearing on the output terminals of the detecting coils 13 and 18 becomes different from the phase difference which is obtainable when rotor 2 is idling. Thus, the angle of torsion on torsion bar 6, that is, the viscosity of the viscous material being measured, can be measured with greater accuracy and stability by detecting the changes of the phase difference.

Figure 2:
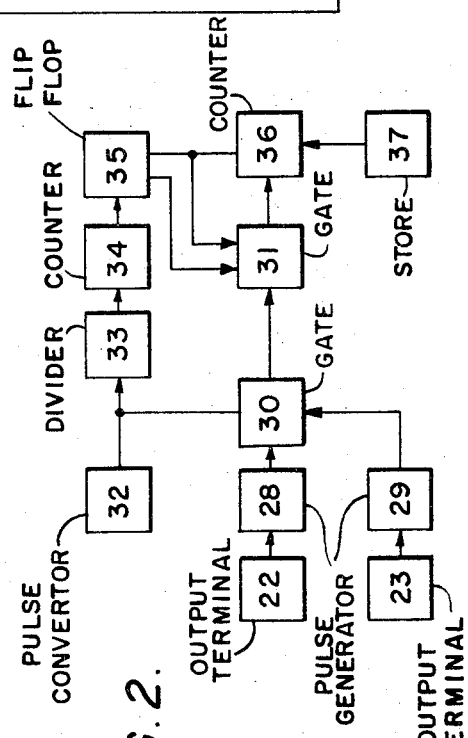
FIG. 2 is a block diagram of a digital detector circuit for use with the present invention.

FIG. 2 is a block diagram showing an example of a circuit whereby the phase difference between the output voltages is detected, wherein: 22 and 23 are output terminals of detecting coils 13 and 18 respectively shown in FIG. 1. 28 and 29 are gating pulse generation circuits, 30 and 31 are gating circuits, 32 is a clock pulse generating circuit, 33 is a frequency dividing circuit, 34 is a present counter, 35 is a flip-flop circuit, 36 is a counter and 37 is a storage/indication circuit.

The individual circuit configurations of the gates, counters, pulse generators, flip flops and store are of conventional construction and well known in the art. Therefore, in the interest of brevity, schematic diagrams are not illustrated, and reference may be made to standard texts for illustrations of such circuits.

As described hereinbefore, the AC output voltages of the same frequency appearing on said output terminals 22 and 23 by turning of torsion bar 6 and rotor 2 are applied to pulse generators 28 and 29, respectively, and converted into individual square waves. The square waves are then differentiated in a known manner and only the positive side pulses are applied to the gating circuit 30.

Figure 3:
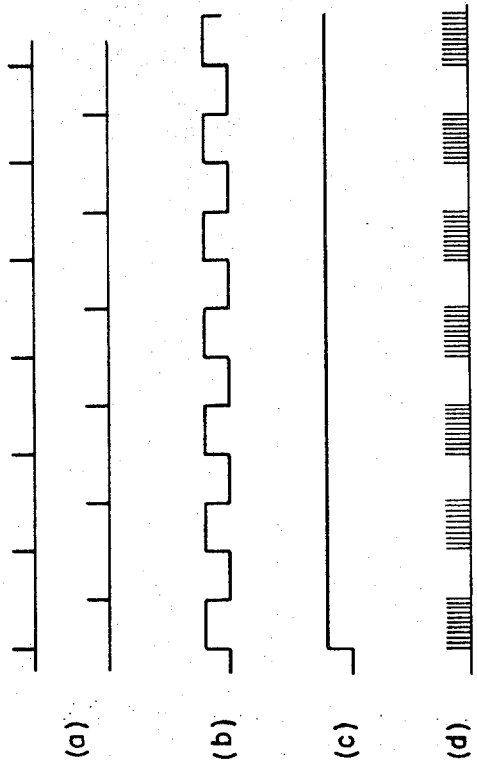
FIG. 3 (a) is a line graph illustrating the phase difference of the voltages appearing on terminals 22 and 23 of the meter instrument of FIG. 1 and the shape of the signals applied to pulse generators 28 and 29 of FIG. 2.

Assuming, the phase difference of AC voltages appearing on output terminals 22 and 23 when said torsion bar 6 and rotor 2 run idle is, for example, 180° (of course, any angle other than 180° can be permitted), the output pulses produced by pulse generating circuits 28 and 29 have a phase difference of 180° as shown in FIG. 3 (a). Therefore, when forming the configuration in which, for example, gating circuit 30 is conductive by the pulse produced and delivered by the pulse generating circuit 28 and gating circuit 30 is cut off by the pulse produced and delivered by pulse generating circuit 29, the period of conductivity of the gating circuit 30 becomes one half of the repetition cycle of pulse delivered by pulse generating circuit 28 (or 29) as shown in FIG. 3 (b).

The clock pulse delivered by clock pulse generating circuit 32 is applied to gating circuit 30 and through gating circuit 30 to gate 31 during the period of conductivity of the latter. At the same time, the clock pulse delivered by clock pulse generating circuit 32 is divided by frequency dividing circuit 33 and then counted by preset counter 34. When reaching a preset value, flip-flop circuit 35 is inversed by the digital output of said preset counter 34, causing the gating circuit 31 to conduct. When preset counter 34 reaches a preset value, as above-mentioned, it is reset, for example, by the digital output of the present counter 34 and starts again to count pulses from frequency dividing circuit 33. When counter 34 reaches its preset value, flip-flop circuit 35 is inverted, causing gating circuit 31 to cut off. Therefore, when setting up the open-and-close period of gating circuit 31 which is far greater than that of said gating circuit 30, the open-and-close condition of gating circuit 31 becomes that as shown in FIG. 3 (c).

The clock pulse delivered by clock pulse generating circuit 32 is allowed to pass through gating circuit 30, as described hereinbefore, only when it conducts. Moreover, the clock pulse is applied to counter 36 through gating circuit 31 only when it is conductive. Therefore, pulses passing through gating circuit 31 while it conducts are divided into pulse groups in accordance with the open-and-close operation of the gating circuit 30, as illustrated in FIG. 3 (d). These pulse groups are added to said counter 36 and thus digital counting is achieved.

Having preset the complement to be counted by counter 36 during the single conductivity of gating circuit 31 to said counter 36, counter 36 delivers a carry signal simultaneously when gating circuit 31 is cut off, the storage/indication circuit 37 would indicate zero, that is, zero viscosity.

When turning rotor 2, with any viscous material in fixed tank 1 as shown in FIG. 1, torsion is produced on torsion bar 6. As described hereinbefore, the phase difference of the output pulses from pulse generating circuits 28 and 29 is caused to change from 180°, the set value. Since the conductivity period of gating circuit 30 changes, the number of pulses counted by counter 36 during the conductivity of gating circuit 31 also changes. In accordance with the varying digital value, the indication of storage/indication circuit 37 also changes from zero to indicate the viscosity of the material being measured. Moreover, counter 36 is reset by the inverse output of flip-flop circuit 35 to be ready for the next measurement. During the period, storage/indication circuit 37 continues to indicate the previous measured value and upon the completion of the next measurement a new value is indicated.

When detecting a phase difference as described hereinbefore, there may be a possibility of the occurrence of an error only when starting to count the first pulse group and the last one among those pulse groups as shown in FIG. 3 (d). Therefore, the counting error, that is, the detection error of phase difference, can be kept to a minimum by making the open and close cycle of gating circuit 30 much smaller than that of gating circuit 31, and making the number of pulse groups (FIG. 3 (d)) per single measurement much greater and, at the same time, letting the number of pulses of each of the pulse group be large.

The above description also applies to the structure in which ring-shaped magnetic pickups are used. Alternatively, two magnetic pickups comprising magnetic bars around which detection coils are wound in conjunction with permanent magnets can be used.

In the viscometer illustrated in FIG. 1, when the turning velocity of the torsion bar 6 is low, the changing rate of magnetic reluctance between the toothed cylinder 7 (or 8) and the ring 10 (or 15) is also low, causing the change in magnetic flux which crosses the detection coil 13 (or 18) to be low. As a result, the voltage induced on the detection coil 13 (or 18) becomes low which may result in detection errors.

Figure 4:
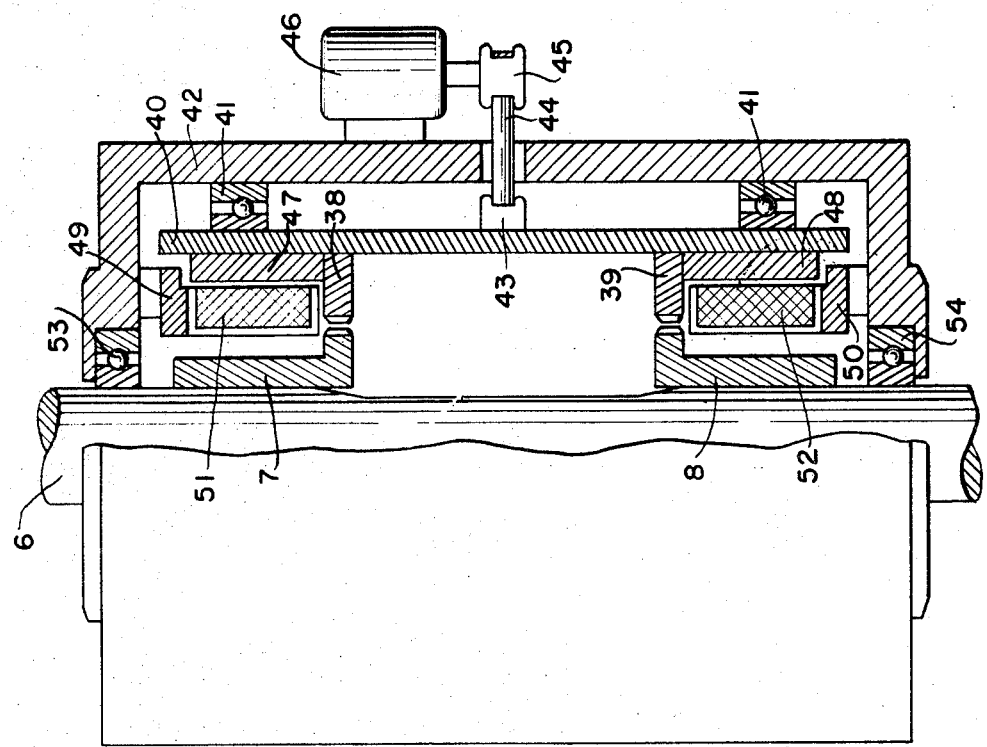
FIG. 4 is a partial sectional view of an embodiment of a viscometer having rotationally supported magnetic pickup members.

FIG. 4 shows the construction of a viscometer wherein such a defect as above-mentioned can be eliminated. Namely, the drawing is a partial sectional view of the portion of the viscometer where the torsion bar and magnetic pickups are installed. In FIG. 4, 6 is the torsion bar installed between motor 24 and rotary shaft 3 of rotor 2, in the same was as in FIG. 1. 7 and 8 are cylinders of a magnetic material, having gear teeth on their respective exterior circumferences. Cylinders 7 and 8 are fixed adjacent to both ends of said torsion bar 6, as shown in FIG. 1. 38 and 39 are rings composed of a magnetic material, having gear teeth on their respective interior circumferences. Rings 38 and 39 are coaxially supported with cylinders 7 and 8. A proper gap is maintained between the rings and the portions where teeth exist on the exterior circumferences of the cylinders. 40 is a cylindrical coupler having rings 38 and 39 on both ends of it. Coupler 40 is held by a housing 42 through a ball bearing support means 41, and is freely rotatable about the axis of housing 42. 43 is a pulley, 44 is a drive belt, 45 is another pulley, 46 is a motor, 47 and 48 are cylindrical permanent magnets, 49 and 50 are yokes, and 51 and 52 are detection coils. Permanent magnets 47 and 48, are installed inside coupler 40, and yokes 49 and 50 and detection coils 51 and 52 are installed inside housing 42 in a configuration as shown in FIG. 4. Therefore, yokes 49 and 50 and detection coils 51 and 52 remain stationary. Housing 42 is fixed by means of proper supports and is so constructed that ball bearings 53 and 54 are between housing 42 and torsion bar 6, so that torsion bar 6 rotates freely with a gap between yokes 49 and 50 and cylinders 7 and 8.

When turning coupler 40, by means of motor 46, pulley 45, drive belt 44 and pulley 45 rings 38 and 39 are caused to rotate. When rings 38 and 39 are rotated, a change occurs in the gap between the teeth on the interior circumference of each of rings 38 and 39 and that on the exterior circumference of each of cylinders 7 and 8. This change in the gap, causes the magnetic flux in each magnetic path formed by rings 38 and 39, cylinders 7 and 8, yokes 49 and 50, and cylindrical permanent magnets 47 and 48 to also change, causing AC voltages to be induced on detection coils 51 and 52.

When the number of teeth on the exterior circumference of each of cylinders 7 and 8 are equal in number and those on the interior circumference of each of rings 38 and 39 are also equal, the frequencies of the AC voltages induced on detection coils 51 and 52 are also equal to each other. The phase difference of the induced AC voltages can be compared to a reference phase difference by detecting the phase difference with a circuit, for example, as shown in FIG. 2.

When rotating torsion bar 6 in the opposite direction to the direction of rotation of rings 38 and 39, and torsion is produced on torsion bar 6 in accordance with the viscosity of a viscous material being measured, the correlation between the teeth on the exterior circumference of cylinders 7 and 8 changes. As a result, the phase difference of AC voltage induced on detection coils 51 and 52 differs from the reference phase difference. Therefore, the torsion on torsion bar 6, that is, the viscosity of the viscous material being measured, can be calculated by detecting the change in the phase difference.

In this case, the turning direction of torsion bar 6 and of cylinders 7 and 8 installed thereon is opposite to that of rings 38 and 39. Because of this, even if torsion bar 6 rotates slowly, the change in the gap between cylinders 7 and 8 and rings 38 and 39 is faster or greater. Therefore, the rate of the change of the magnetic flux in each magnetic path becomes greater, thereby increasing the AC voltages induced on detection coils 51 and 52.

With such rotary type magnetic pickups, the velocity measurement can also be achieved using the following method: firstly rotor 2 (FIG. 1) is affixed at the lower portion of torsion bar 6 as viewed in FIG. 4 and the upper portion of said torsion bar 6 is rigidly supported against rotation. Tank 1 (FIG. 1), in which a viscous material being measured, is arranged so that it can be turned around the center shaft of the tank by the motor. With the above setup, rings 38 and 39 are turned with tank 1 and the phase difference of AC voltage induced on detection coils 51 and 52 is used as a reference. Then, when rotating the tank and the rings 38 and 39, rotor 2 starts turning in accordance with the viscosity of the viscous material being measured, torsion is produced on torsion bar 6 since the upper portion of torsion bar 6 is fixed. The torsion thus produced corresponds to the viscosity of the viscous material being measured.

Thus, the viscosity of a viscous material can be measured by detecting the phase difference of AC voltages induced on detection coils 51 and 52 by rotation of rings 38 and 39 and the change produced on the torsion bar 6 by the material in the container and by measuring the quantity of changes in the phase difference against said reference value.

Figure 5:
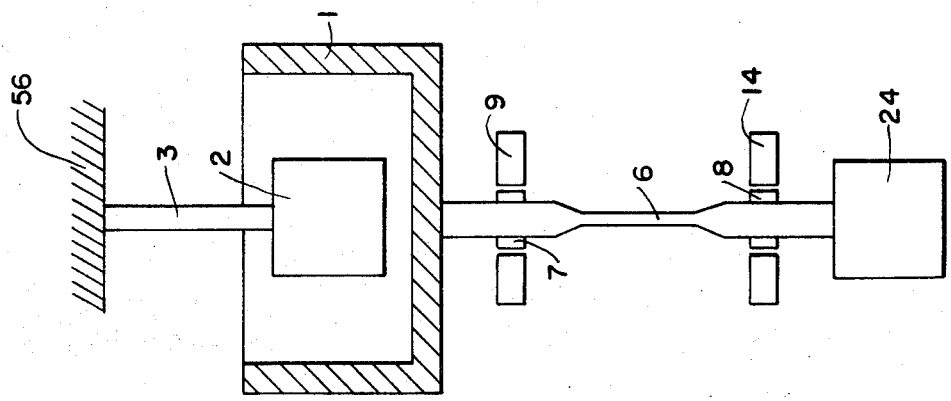
FIG. 5 is an alternate embodiment of the present invention wherein one end of the torsion bar is fixed to the tank and the other end of the bar is rigidly supported.

The use of the rotary type magnetic pickups described hereinbefore, enable the viscosity of a viscous material to be measured using a setup as shown in FIG. 5. Referring to FIG. 5, 1 is a tank, 2 is a rotor, 3 is the rotary shaft thereof, and 24 is a motor. In this setup, the upper portion of torsion bar 6 as viewed in the drawing is fixed on the center of the bottom of tank 1 and the lower portion of torsion bar 6 is fixed to a rigid support 55. 7 and 8 are toothed cylinders, like those shown in FIG. 4, and 9' and 14' are the rotary type magnetic pickups, the same ones as described and illustrated in FIG. 4. Firstly, a reference phase difference is detected by synchronously turning magnetic pickups 9' and 14' with rotor 2 left stationary (and therefore no torsion is produced on said torsion bar 6). When turning rotor 2 by motor 24, tank 1 starts to rotate around torsion bar 6 and a torsion corresponding to the viscosity of the viscous material is produced on torsion bar 6, causing the output phase difference on the rotary type magnetic pickups 9' and 14' to vary from the reference phase difference. Thus, the viscosity of the viscous material can be measured by measuring the quantity of the changes in the phase difference.

Figure 6:
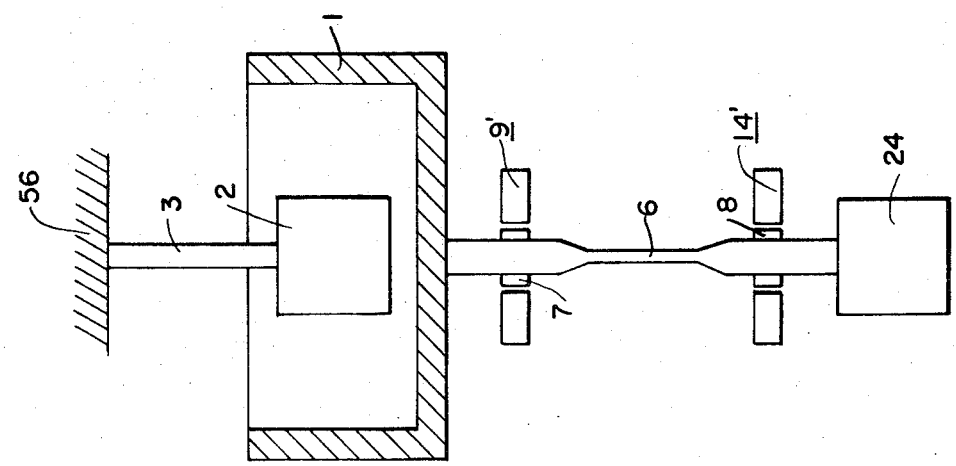
FIGS. 6 and 7 are alternate embodiments of the invention wherein the impeller rotor within the tank is rigidly supported.

FIG. 6 shows an alternate embodiment of the construction of the viscometer of the present invention. Referring to FIG. 6, rotor 2 is mounted to one end of the center shaft 3, the other end of which is fixed on a retainer 56. One end of torsion bar 6 is attached to the bottom of tank 1, and the other end is connected to the rotary shaft of motor 24. 7 and 8 are gear toothed cylinders like those indicated in FIG. 4. 9' and 14' are rotary type magnetic pickups, the same as those described in FIG. 4.

In operation, a reference phase difference is detected by rotating pickups 9' and 14' with tank 1 and torsion bar 6 maintained in a stop mode by the stop of motor 24. When turning tank 1 through torsion bar 6 by motor 24 with magnetic pickups 9' and 14' left turning, torsion occurs on torsion bar 6 in accordance with the viscosity reluctance of a viscous object to be measured located within the tank. Therefore, by detecting the changes in output phase difference of magnetic pickups 9' and 14' the viscosity of the object can be measured.

Figure 7:
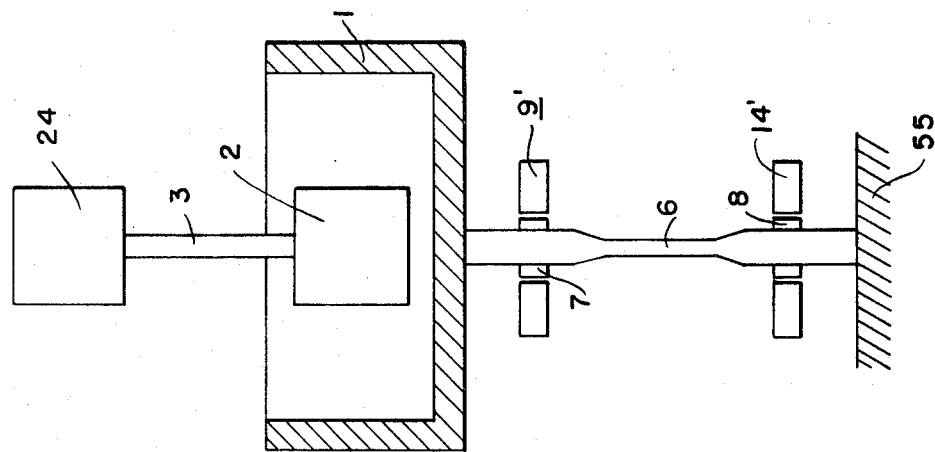

Another embodiment of a viscometer in accordance with this invention is shown in FIG. 7. In this embodiment one end of shaft 3 of rotor 2 is fixed on retainer 56. One end of torsion bar 6 is attached to the bottom of said tank 1 and the other end is attached to the rotary shaft of motor 24. Magnetic pickups 9 and 14 are installed opposite to gear toothed cylinders 7 and 8 on torsion bar 6, as described previously and shown in connection with FIG. 1. A reference phase difference is detected by magnetic pickups 9 and 14 with the empty tank 1 run idle through torsion bar 6 by motor 24. The viscosity of a viscous object is measured by the change of output phase difference of magnetic pickups 9 and 14 caused by torsion on torsion bar 6 when turning tank 1 in which a viscous material is placed.

I claim:

1. A torsion type digital viscometer, comprising a fixed tank adapted to contain a viscous material the viscosity of which is to be measured, a rotor adapted to be immersed into the viscous material, a torsion bar connected to said rotor, motor means connected to drive said rotor by means of said torsion bar, said torsion bar including gear teeth mounted on said torsion bar at axial intervals, fixed magnetic pickups supported opposite said teeth and a detector circuit connected to said pickups for detecting the output phase difference signal between said magnetic pickups, a gate circuit to be opened and closed by the detected phase difference signal, a clock pulse oscillating circuit connected to said gate circuit, and counter connected to the output circuit of said gate circuit.

2. A torsion type digital viscometer, comprising a tank adapted to contain a viscous material the viscosity of which is to be measured, a shaft mounted rotor adapted to be immersed into the viscous material, a torsion bar connected to the shaft of said rotor, a motor connected to rotatably drive said rotor through said torsion bar, a pair of cylinders each having gear teeth on their exterior circumferences mounted on said torsion bar at axial intervals, a pair of rings each having gear teeth on their interior circumferences, each ring being mounted coaxially with an associated cylinder and about the exterior circumference of said associated cylinder, a cylindrical coupler holding said rings in one body, mounting means for said cylindrical coupler and said rings enabling said coupling and rings to rotate about its axis and free of said torsion bar, a pair of spaced magnets and yokes forming closed magnetic paths together with said cylinders and said rings, said magnets and yokes being fixed in a state of repose, regardless of the turning motion of said cylinders and said rings, detecting coils disposed in the magnetic flux path in each of said closed magnetic paths, and a detection circuit connected to the detecting coils for detecting the output phase difference between said detecting coils.

3. A torsion type digital viscometer comprising a tank adapted to contain a viscous material the viscosity of which is to be measured, a rotor adapted to be immersed into said viscous material, a torsion bar having one end connected to said rotor and the other end fixed to a retainer disposed outside said tank, motor means operatively connected to drive said rotor, a pair of cylinders on said torsion bar at axial intervals, each said cylinder having gear teeth on its exterior circumferences, a pair of rings disposed axially along the exterior circumference of said cylinders and having gear teeth on their internal circumferences each ring being cooperatively associated with a cylinder, a cylindrical coupler, means for mounting said rings to said coupler in one body, motor means for turning said rings and cylindrical coupler independently of said torsion bar, a magnet and a yoke associated with each cooperating ring and cylinder and forming closed magnetic paths together with said cylinder and ring, said magnet and yoke being stationary and independently supported from said cylinders and rings, detection coils disposed in the magnetic flux path in each of said closed magnetic paths, and detection circuit means connected to said detection coils for detecting the phase difference of the output of each of said detection coils.

4. A torsion type digital viscometer comprising a tank adapted to contain a viscous material to be measured, a rotor adapted to be immersed into said viscous material, motor means for rotatably driving said rotor, a torsion bar having one end connected to the center area of the bottom of said tank and the other end to a fixed external support, a pair of cylinders each having gear teeth on the exterior circumferences, said cylinders being mounted on said torsion bar at axial intervals, a ring associated with each cylinder and having gear teeth on its interior circumference disposed opposite the gear teeth of an associated cylinder, a cylindrical coupler holding said rings in one body, drive means for rotatably driving said cylindrical coupler independently of said torsion bar, a magnet and a yoke associated with each cylinder and forming a closed magnetic path together with said associated cylinders and its associated ring, said magnet and yoke being kept in a state of repose independent of the rotation of said cylinders and said rings, detecting coils disposed in the magnetic flux path in each of said closed magnetic paths and a detection circuit connected to said detecting coils for detecting the output phase difference of each said detecting coil.

5. A torsion type digital viscometer comprising a tank, a rotor disposed within said tank wherein a viscous material to be measured is contained, said rotor being fixed at one end on a retainer outside said tank, a torsion bar attached at one end to the center area of the bottom of said tank, a motor attached to the other end of said torsion bar for turning said tank through said torsion bar, a pair of cylinders mounted on said torsion bar at axial intervals, said cylinders having gear teeth on their exterior circumferences, rings mounted axially about the exterior circumferences of said cylinders, said rings having gear teeth on their internal circumferences, a cylindrical bar, a magnet and a yoke disposed to form a closed magnetic path together with an associated cylinder and ring, said magnet and yoke being kept stationary independent of the turning motion of said cylinders and rings, detection coils disposed in the magnetic flux path in each of said closed magnetic paths, and detection circuit means connected to said detection coils for detecting the phase difference of the output of each of said detection coils.

6. A torsion type digital viscometer comprising a tank, a rotor disposed within said tank wherein a viscous material to be measured is contained, said rotor being fixed on a retainer outside said tank, a torsion bar attached at one end to the center area of the bottom of said tank, a motor connected to the other end of said torsion bar for turning said tank through said torsion bar, a pair of gear toothed projections installed on said torsion bar at axial intervals, fixed type magnetic pickups installed face to face to said gear toothed projection and circuit means for detecting the phase difference of the output between said magnetic pickups.

* * * * *